US012612867B2

(12) United States Patent
Mitchell et al.

(10) Patent No.: US 12,612,867 B2
(45) Date of Patent: Apr. 28, 2026

(54) TURBINE COMPONENT HOLDER FOR IMAGING

(71) Applicant: Chromalloy Gas Turbine LLC, Palm Beach Gardens, FL (US)

(72) Inventors: Logan Ryan Mitchell, Palm Beach Gardens, FL (US); Zachary Michael Au Kanai'i Oras, Riverview, FL (US); Zachary Charles Hopkins, San Diego, CA (US)

(73) Assignee: Chromalloy Gas Turbine LLC, Palm Beach, FL (US)

( * ) Notice: Subject to any disclaimer, the term of this patent is extended or adjusted under 35 U.S.C. 154(b) by 193 days.

(21) Appl. No.: 18/422,446

(22) Filed: Jan. 25, 2024

(65) Prior Publication Data

US 2025/0243787 A1 Jul. 31, 2025

(51) Int. Cl.
| | |
|---|---|
| *G01N 23/04* | (2018.01) |
| *F01D 21/00* | (2006.01) |
| *F01D 25/28* | (2006.01) |
| *G01N 23/083* | (2018.01) |
| *G01N 23/18* | (2018.01) |

(52) U.S. Cl.
CPC ......... *F01D 25/285* (2013.01); *F01D 21/003* (2013.01); *G01N 23/04* (2013.01); *G01N 23/083* (2013.01); *G01N 23/18* (2013.01); *F05D 2260/83* (2013.01); *G01N 2223/63* (2013.01); *G01N 2223/646* (2013.01)

(58) Field of Classification Search
CPC ..... F01D 25/285; F01D 21/003; G01N 23/04;

G01N 23/083; G01N 23/18; G01N 2223/63; G01N 2223/646; G01N 23/046; F05D 2260/83; F05D 2270/8041
See application file for complete search history.

(56) References Cited

U.S. PATENT DOCUMENTS

| | | | |
|---|---|---|---|
| 10,416,096 B2 | 9/2019 | Freeman et al. | |
| 2020/0238448 A1 | 7/2020 | Hampshire et al. | |
| 2022/0025784 A1 | 1/2022 | Ren | |

FOREIGN PATENT DOCUMENTS

| | | | | |
|---|---|---|---|---|
| CN | 101435784 A | * | 5/2009 | ........... G01N 23/046 |
| CN | 101435784 B | | 1/2012 | |
| CN | 113406116 B | | 9/2022 | |
| EP | 2 108 945 B1 | | 10/2014 | |

OTHER PUBLICATIONS

Extended European Search Report dated Jun. 30, 2025 issued in European Application No. 25152723.0 (13 pages).

* cited by examiner

*Primary Examiner* — Kiho Kim
(74) *Attorney, Agent, or Firm* — NIXON & VANDERHYE, PC

(57) ABSTRACT

A holder configured to hold a turbine component in position for internal imaging includes a main body configured to support one or more turbine components and one or more holding spaces in in the main body. Each holding space being configured to retain a corresponding turbine component. Each of the one or more holding spaces is configured to automatically secure and orient the corresponding turbine component upon the turbine component being inserted into the holding space.

25 Claims, 8 Drawing Sheets

TURBINE COMPONENT HOLDER FOR IMAGING

FIELD OF THE INVENTION

The technology relates to an arrangement for positioning one or more turbine components (including but not limited to turbine blades, turbine vanes, and other such turbine components) for imaging and particularly to a system for positioning turbine components at a plurality of predetermined orientations for imaging.

BACKGROUND

Turbine components (such as, for example, turbine blades and turbine vanes) in a gas turbine operate in an environment in which they are exposed to extreme temperatures, stresses, vibrations and corrosive gases. Because of their operating environment, turbine components are from time to time removed from the gas turbine and inspected for micro-cracks, corrosion, defects, wear and other damage (collectively damage). The inspection includes searching for micro-cracks and internal defects in the turbine component not visible from an external inspection.

X-ray imaging is used to inspect and analyze turbine components. An X-ray imaging system includes an X-ray source and a detector array. The turbine component is positioned between the source and detector array at one or more predefined orientations. The turbine component is imaged at each of the orientations. Each orientation allows the turbine component to be imaged to reveal potential damage to the turbine component.

There is a need to hold turbine components precisely at each of the predefined orientations while the turbine components are subjected to X-rays during imaging. The orientations are selected to find microcracks and other damage to a turbine component, especially at regions of the turbine component susceptible to micro-cracks and other damage and/or regions where such damage could result in failure of the turbine component. Precisely orienting turbine components for inspecting aids in finding micro-cracks and other defects, and ensuring uniform inspections of many turbine components.

Conventional practice is to orient turbine components using foam blocks that support the turbine components. Moving the turbine components on the foam blocks into the predefined orientations requires a significant amount of labor to ensure that the turbine component is in the correct orientation and does not move during X-ray imaging.

SUMMARY

Inventors propose systems and method that solve the problems discussed above.

In one aspect of the technology, a holder is configured to hold a turbine component in position for internal imaging. The holder includes a main body configured to support one or more turbine components; and one or more holding spaces in in the main body, each holding space being configured to retain a corresponding turbine component. Each of the one or more holding spaces is configured to automatically secure and orient the corresponding turbine component by way of an interference fit upon the turbine component being inserted into the holding space. The one or more holding spaces are configured to enable an imaging system to take an image of multiple turbine components in one or more orientations at the same time.

A further aspect of the technology includes the preceding aspect and wherein the holder may be configured to hold turbine components in multiple orientations.

A further aspect of the technology includes any of the preceding aspects and wherein each of the one or more holding spaces are in the form of a notch in the main body, each notch being open at the top and at opposing lateral sides.

A further aspect of the technology includes any of the preceding aspects and wherein each notch is oriented at an angle relative to a horizontal plane so that the notch receives a corresponding turbine component along a plane that intersects horizontal at the angle.

A further aspect of the technology includes any of the preceding aspects and wherein the one or more holding spaces include two sets of holding spaces with each holding space of the first set being configured to hold a corresponding turbine component at a first orientation and each holding space of the second set being configured to hold a corresponding turbine component at a second orientation.

A further aspect of the technology includes any of the preceding aspects and wherein the one or more holding spaces are bound by opposing contoured surfaces.

A further aspect of the technology includes any of the preceding aspects and wherein the holder is formed by way of 3D printing.

In yet another aspect of the technology, an x-ray imaging system for imaging a plurality of turbine components includes an x-ray source; a digital detector array; a holder according to any of the preceding aspects (the holder being positioned between the x-ray source and the digital detector); and a control system configured to actuate the x-ray source and receive data from the digital detector.

In yet another aspect of the technology, a holder is configured to hold a plurality of turbine components in position for internal imaging. The holder includes a main body configured to support the plurality of turbine components; a first set of notches in the main body configured to hold turbine components in a first orientation; a second set of notches in the main body configured to hold turbine components in a second orientation. Each notch of the first and second sets of notches is configured to automatically secure and orient a corresponding turbine component upon the turbine component being inserted into the holding space. The first and second sets of notches are configured to enable an imaging system to take an image of multiple turbine components in one or more orientations at the same time.

A further aspect of the technology includes the preceding aspect and wherein each of the notches of the first and second sets of notches is open at the top and at opposing lateral sides.

A further aspect of the technology includes any of the preceding aspects and wherein each notch of the first and second sets of notches is oriented at an angle relative to a horizontal plane so that the notch receives a corresponding turbine component along a plane that intersects horizontal at the angle.

A further aspect of the technology includes any of the preceding aspects and wherein the notches of the first and second sets of notches is bound by opposing contoured surfaces.

A further aspect of the technology includes any of the preceding aspects and wherein the notches of the first and second sets of notches are configured to hold a root portion of a corresponding turbine component.

A further aspect of the technology includes any of the preceding aspects and wherein the holder is formed by way of 3D printing.

In yet another aspect of the technology, an x-ray imaging system for imaging a plurality of turbine components includes an x-ray source; a digital detector array; a holder according to any of the preceding aspects (the holder being positioned between the x-ray source and the digital detector); and a control system configured to actuate the x-ray source and receive data from the digital detector.

In yet another aspect of the technology, a method for positioning a turbine component for x-ray imaging includes sliding a turbine component into receiving space in a turbine component holder; and positioning the turbine component and the turbine component holder between an x-ray source and a digital detector array. Sliding the turbine component into the opening in the turbine component holder automatically orients the turbine component in a target position for imaging the internal structure of the turbine component, and sliding the turbine component into the opening in the turbine component holder automatically secures the turbine component in the receiving space. The one or more receiving spaces enable an imaging system to take an image of multiple turbine components in one or more orientations at the same time.

A further aspect of the technology includes the preceding aspect and wherein the turbine blade holder includes a first set of receiving spaces and a second set of receiving spaces. The receiving spaces of the first set may only receive the turbine components in a first orientation. The receiving spaces of the second set may only receive the turbine components in a second orientation different from the first orientation.

A further aspect of the technology includes any of the preceding aspects and wherein the method further includes imaging multiple turbine components simultaneously. The multiple turbine components are secured to the same turbine component holder, and the turbine component holder holds different turbine components in different orientations.

A further aspect of the technology includes any of the preceding aspects and wherein the turbine component is held in place within the receiving space by gravity.

A further aspect of the technology includes any of the preceding aspects and wherein the turbine component is held in place by an interference fit.

In another aspect of the technology, the turbine component holder may be used to present turbine components for x-ray inspection with no other or only minimal additional parts needed to support the turbine component. The turbine component holder may also be used to support turbine components for other types of non-destructive testing (NDT) or during destructive testing. The turbine component holder allows the turbine components to be oriented for inspection in a manner that is faster than conventional techniques using foam supports. The turbine component holder also allows for quick removal of X-ray imaged turbine components and placement into the holder of another turbine component. This speeds the process of setting up a turbine component to be inspected, X-ray imaging the turbine component and removing the turbine component after imaging. By ensuring a uniform orientation of turbine components, the turbine component holder also improves inspection of turbine components by ensuring that each turbine component is imaged from the same orientation(s). Because the turbine component holder allows for fast setup of turbine components for X-ray imaging and holding the turbine components at uniform orientation(s) during imaging, the inspection of turbine components can be done faster and with greater uniformity of inspections that was able to be done using foam blocks to support turbine components.

In another aspect of the technology, a turbine component holder may be 3D printed out of any material with a hardness of about 80 or higher and tensile strength of at least 750 MPa (any rigid and non-elastic material). All holder components may be printed and assembled together without fasteners and may hold turbine components at two different angles for an x-ray imaging machine to capture internal views of the turbine component during the inspection of the turbine component. One set of the turbine components may be held at a first orientation in which a base of the turbine component is held at about +45 degrees and another set of turbine components may be held in a second orientation that is the opposite of the first orientation in which the base of the turbine component is held at about −45 deg. The holder may use a dovetail design that is an interference fit and helps stabilize the turbine component. The turbine component holder may hold all of the turbine components in the same orientation rather than multiple orientations to allow for more space between turbine components.

DETAILED DESCRIPTION OF EXAMPLE NON-LIMITING EMBODIMENTS

The embodiments described herein refer to turbine components including but not limited to blades, vanes, and/or other turbine components. For ease of description, the turbine component will be referred to as an exemplary "turbine blade" unless otherwise noted. However, this description is not intended to limit the embodiments in any manner.

Figure 1:
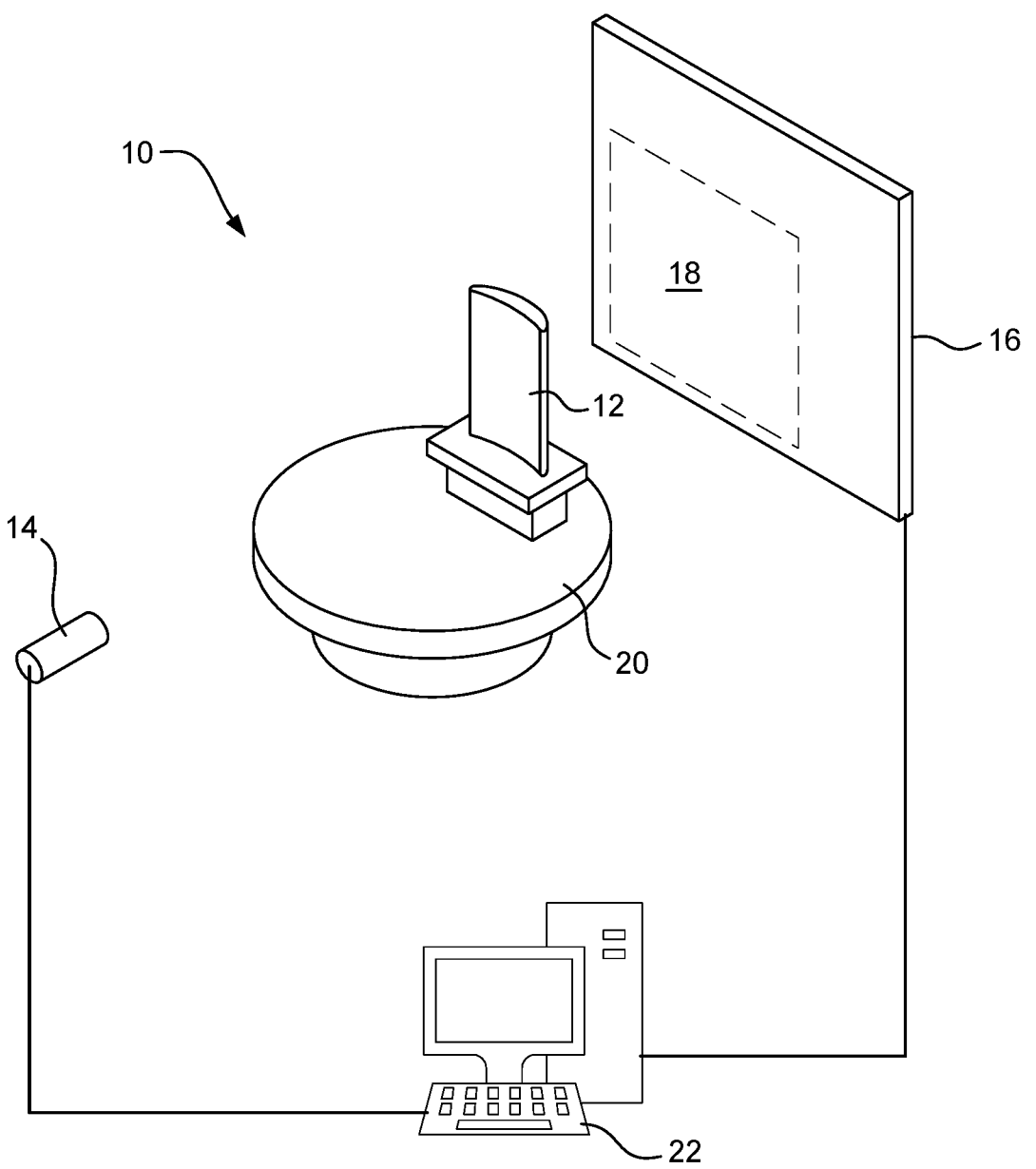
FIG. 1 is a schematic illustration of an x-ray imaging system.

FIG. 1 illustrates an exemplary x-ray imaging system 10 for capturing an X-ray image of a turbine blade 12. The x-ray imaging system 10 may be used for detecting microcracks or other indications of fatigue and wear. The x-ray imaging system 10 may include an x-ray source 14, a digital detector array 16 with an imaging area 18, a platform 20 that supports the turbine blade 12, and a control system 22.

Figure 2:
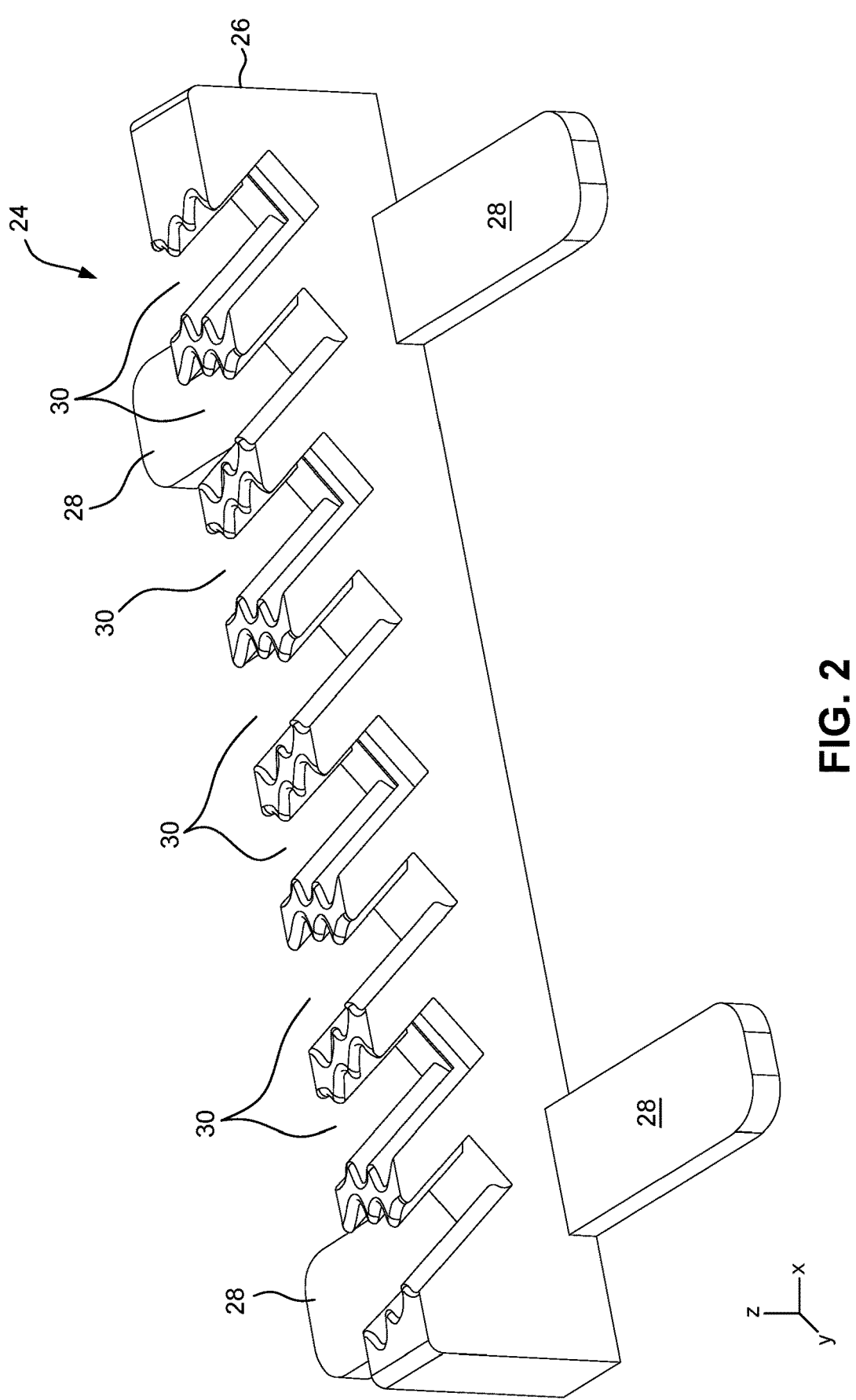
FIG. 2 is a perspective view of an exemplary turbine component holder.

FIG. 2 illustrates an exemplary blade holder 24 that may be positioned on the platform 20 and may be configured to hold one or more turbine blades 12 at a predetermined or preset orientation relative to the x-ray source 14 and the digital detector array 16. The blade holder 24 may include a main body 26 and one or more stabilizing supports 28 (e.g., four) that provide support and stabilization to the main body 26.

The main body 26 may include one or more holding spaces 30, each holding space 30 being configured to hold one turbine blade 12 in a particular orientation. In the exemplary configuration illustrated in FIGS. 2-6, the main body 26 is in the form of a substantially rectangular (or beam) shape, and the holding spaces 30 are in the form of notches in the substantially rectangular shape.

Although the main body 26 is shown as a beam with notches, the main body 26 may have any shape configured to secure the root of a turbine blade 12 in a particular orientation with respect to the x-ray source 14, a digital detector array 16 with an imaging area 18. The notches may have opposing sides formed of parallel ridges and grooves that conform to the fir-tree root of turbine blades to be inserted into each notch. The gap between each notch may be narrowest at the end of the notch that receives the lower end of the fir tree root or dovetail of a turbine blade and widest at the opposite end of the notch which may be adjacent the platform of a turbine blade. The platform is between the fir tree root and airfoil of the turbine blade. In addition, the stabilizing supports 28 may extend laterally from the main body 26 to provide a stable base for the main body 26.

The main body 26 and the stabilizing supports 28 may be 3D printed, molded, welded or a combination of both and may be made from a resin, other type of plastic, or other material (e.g., metal) with a hardness of 80 MPa or higher and a tensile strength of at least 705 MPa. It is contemplated that the material may be rigid and non-elastic.

The main body 26 and the stabilizing supports 28 may be unitarily formed and may comprise a single integrated continuous body. Alternatively, the main body 26 and the stabilizing supports 28 may be separately formed and assembled together. It is contemplated that when separately formed, the main body 26 and the stabilizing supports may be formed in a way that does not require fasteners to secure the components together. For example, the components may be assembled together by way of interference fit, bonding, and adhesive.

It is further contemplated that the main body 26 may have a shape capable of stably supporting itself without the stabilizing supports 28. In such a configuration, the stabilizing supports 28 may be omitted. In addition, the main body 26 and/or the stabilizing supports 28 may include fasteners such as clamps, clips, and bolts that may releasably engage the platform 20. It is further contemplated that the blade holder 24 may be integrated into the platform 20 so that the platform 20 and the blade holder 24 form one integral body.

As can be seen in FIG. 2, the holding spaces 30 may be arranged linearly along the length of the main body 26. In addition, the holding spaces 30 may be open on the top side and the lateral sides so that the turbine blades 12 can be inserted into the holding spaces 30 from above. The open lateral sides of the holding spaces 30 allow the turbine blades 12 to overhang the sides of the main body 26 (see FIG. 4).

Figure 3:
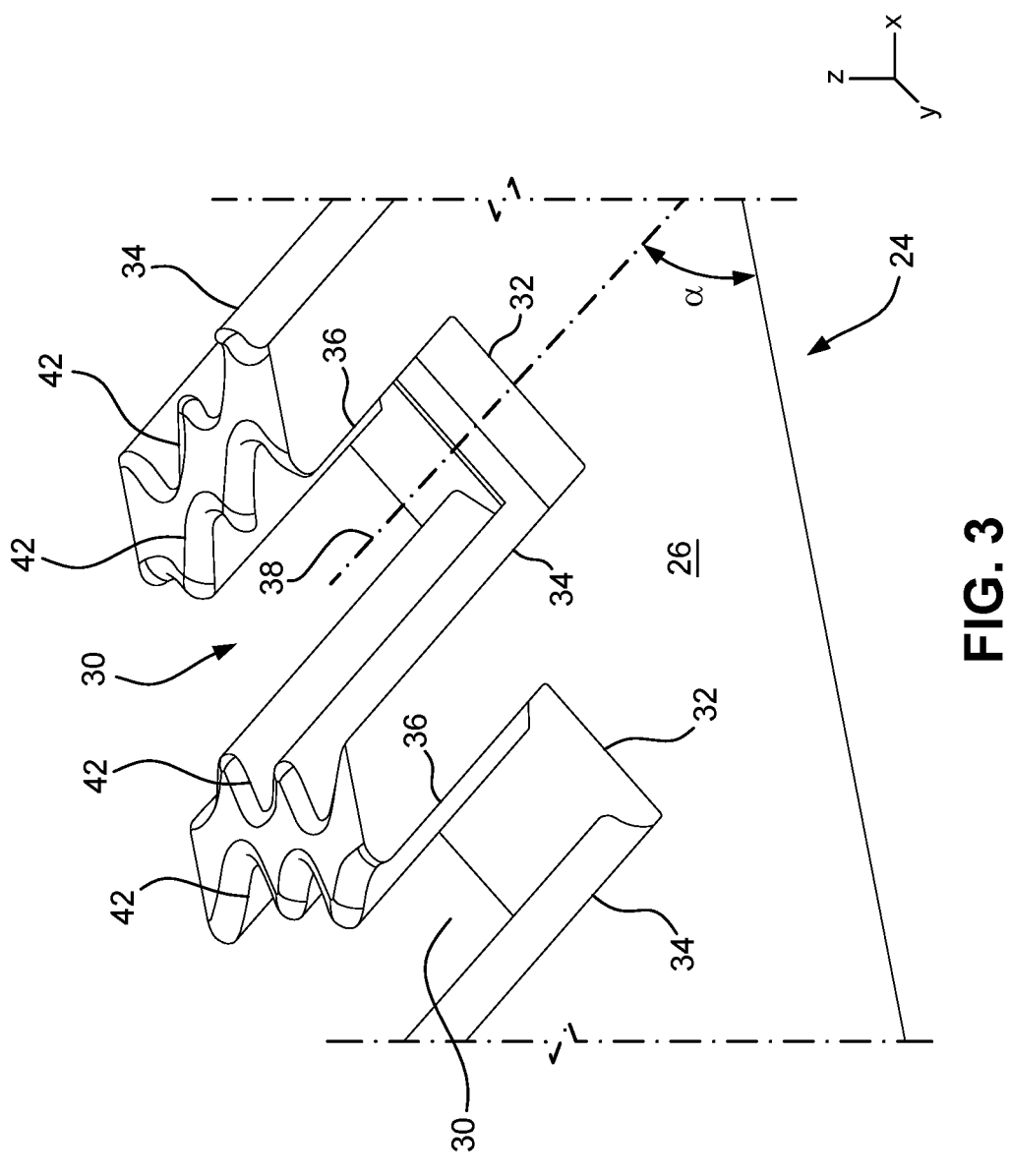
FIG. 3 is sectional view of the turbine component holder of FIG. 2.

FIG. 3 illustrates a more detailed view of the holding spaces 30. As can be seen, each holding space 30 may be formed by a base wall 32, a rear surface 34, and a forward surface 36 that opposes the rear surface 34. Each of the rear surface 34 and the forward surface 36 may extend from the base wall 32 to the upper side of the main body 26. In addition, a distance from the base wall 32 to the top of the main body 26 (i.e., the depth of the holding space 30) is about 2 to 10 cm (for example, about 3 about 5 cm). It is contemplated that the depth of the holding spaces 30 may be about 5 cm.

In addition, each holding space 30, e.g., notch, may be angled relative to a horizontal plane. For example, the base wall 32 may be oriented so that a plane 38 that extends perpendicularly through the base wall 32 forms an angle α with a horizontal plane. The angle α may be between about 20 and about 90 degrees. For example, the angle α may be between about 30 and about 80 degrees. It is contemplated that the angle α may be about 30, about 45, or about 60 degrees. In addition, the angle α for each holding space 30 may be the same throughout the main body 26. This way, the x-ray analysis and the positioning of the multiple turbine blades 12 on the main body 26 is consistent. In addition, the turbine blades 12 may be inserted into the holding spaces 30 in a direction along the plane 38. In other words, the turbine blades 12 may be inserted into and removed from the holding spaces 30 at the angle α.

Figure 4:
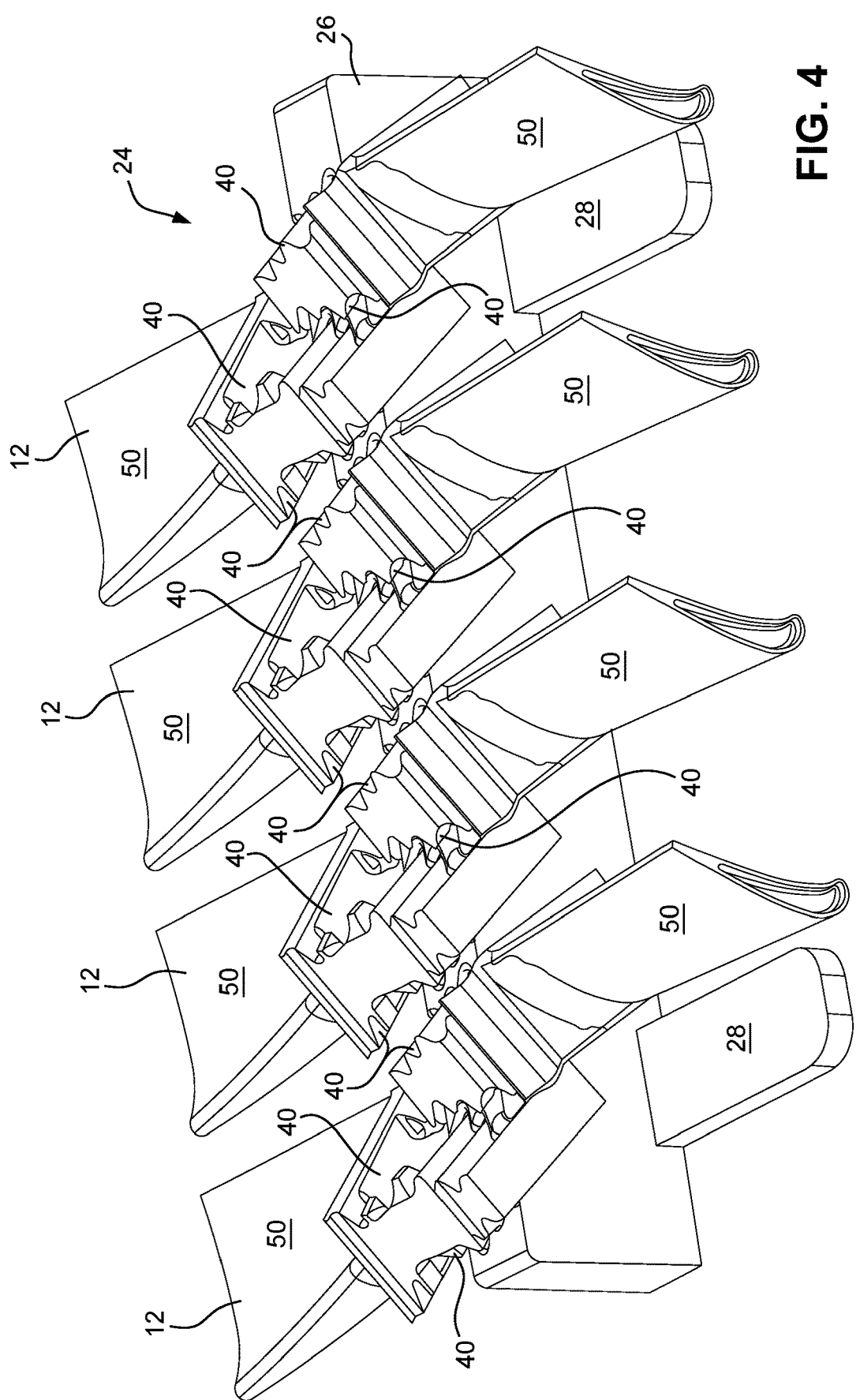
FIG. 4 is another perspective view of the turbine component holder of FIG. 2 with turbine components.

In one configuration, the holding spaces 30 may be sized and shaped to receive a fir tree root or dovetail or root portion (hereafter root portion 40) (see FIG. 4). For example, the rear surface 34 and the forward surface 36 of each receiving space 30 may be contoured and this contour 42 (see FIGS. 3 and 5) may match the contour of the root portions 40 of a turbine blade 12. As can be seen in FIG. 4, the contours of the rear surface 34 and the forward surface 36 interlock with the contour of the root portion 40 of the turbine blade 12 to limit or prevent lateral movement of the turbine blade 12 through the holding space 30. It is contemplated that the rear surface 34 and the forward surface 36 may not be contoured.

Figure 5:
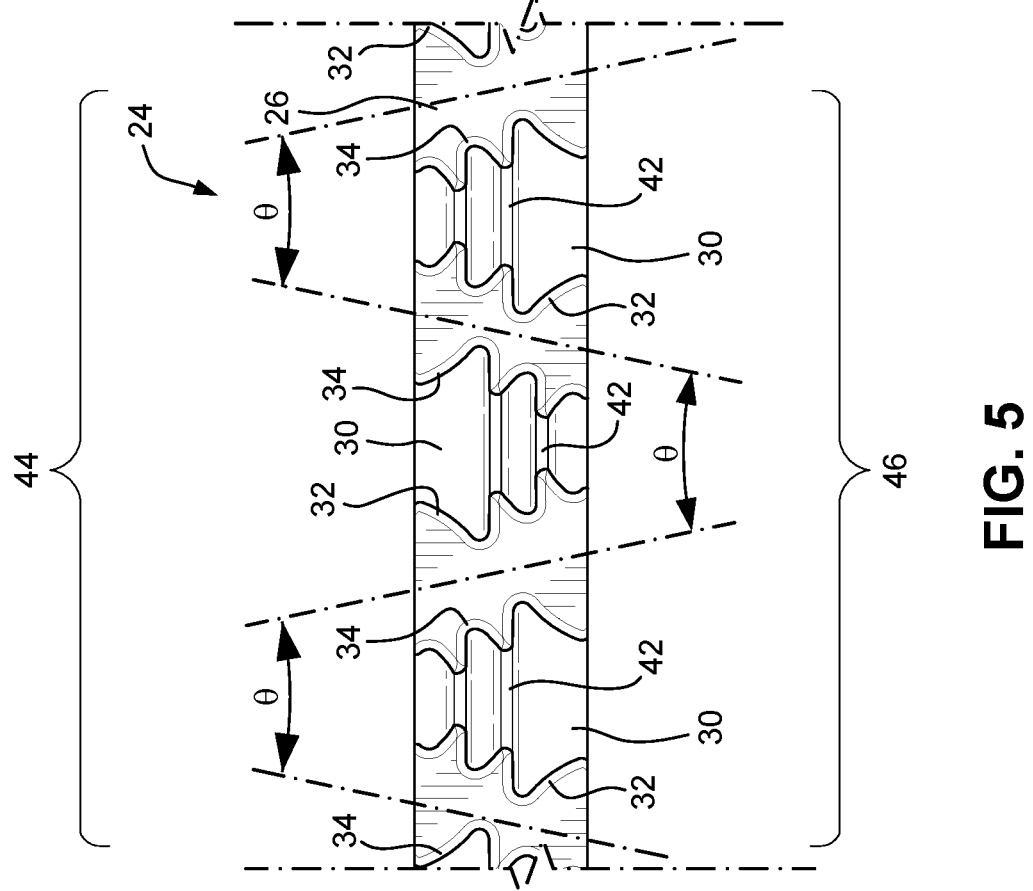
FIG. 5 is a top view of the turbine component holder of FIG. 2.

FIG. 5 is a top view of a section of the main body 26. As can be seen, the main body 26 may have a first lateral side 44 and a second lateral side 46. In addition, each holding space 30 may be separated from each other by a dividing wall 48. One side of each dividing wall 48 may be a rear surface 34 and an opposite side of the dividing wall 48 may be a forward surface 36. In addition, each holding space 30 may be in the form of a lateral dovetail. For example, for a particular holding space 30, the distance between the dividing walls 48 that bound the holding space 30 may be greater on the first lateral side 44 than on the second lateral side 46. The two bounding diving walls 48 may be oriented to form an angle θ that may range between about 20 and about 80 degrees. For example, between about 35 and about 65 degrees. It is contemplated that the angle θ may be about 30 degrees, about 45 degrees, about 50 degrees, or about 60 degrees. The angle θ may match an angle formed by the sides of a root portion 40 of a turbine blade 12.

In addition, as can be seen in FIG. 5, the orientation of the "lateral dovetail" may alternate between adjacent holding spaces 30. For example, for one holding space 30, the wider side of the dovetail may be on the first lateral side 44 of the main body 26 and the narrower side of the dovetail may be on the second lateral side 46 of the main body 26. For a second adjacent holding space 30, the narrower side of the dovetail may be on the first lateral side 44 of the main body 26 and the wider side of the dovetail may be on the second lateral side 46 of the main body.

A distance between the first lateral side 44 and the second lateral side 46 (i.e., the width of the holding space 30 as well as the width of the main body 26) may be within the range of about 2 to about 10 cm (e.g., about 3 to about 5 cm). It is contemplated that the width of the holding space 30 (as well as the main body 26) is about 5 cm. In addition, the distance between dividing walls 48 may be within the range of about 1 to about 3 cm (e.g., about 3 cm). As embodied by the disclosure, the widths of holding spaces 30 are sized to correspond to the root portion of the respect blade, and thus the above width ranges are merely exemplary and not intending to limit the embodiments in any manner.

Due to the alternating dovetail configuration, adjacent turbine blades 12 will be oriented in opposite directions. For example, in one set of the receiving spaces 30, the airfoil portion 50 of the turbine blade 12 will be positioned adjacent to the first lateral side 44 of the main body 26, while in a second set of the receiving spaces 30, the airfoil portion 50 of the turbine blade 12 will be positioned adjacent to the second lateral side 46 of the main body 26. Because adjacent turbine blades 12 are oriented in opposite directions, the distance between turbine blades 12 can be reduced, and more turbine blades 12 may be held on the blade holder 24 at the same time, which allows for more turbine blades 12 to be analyzed at the same time.

Figure 6:
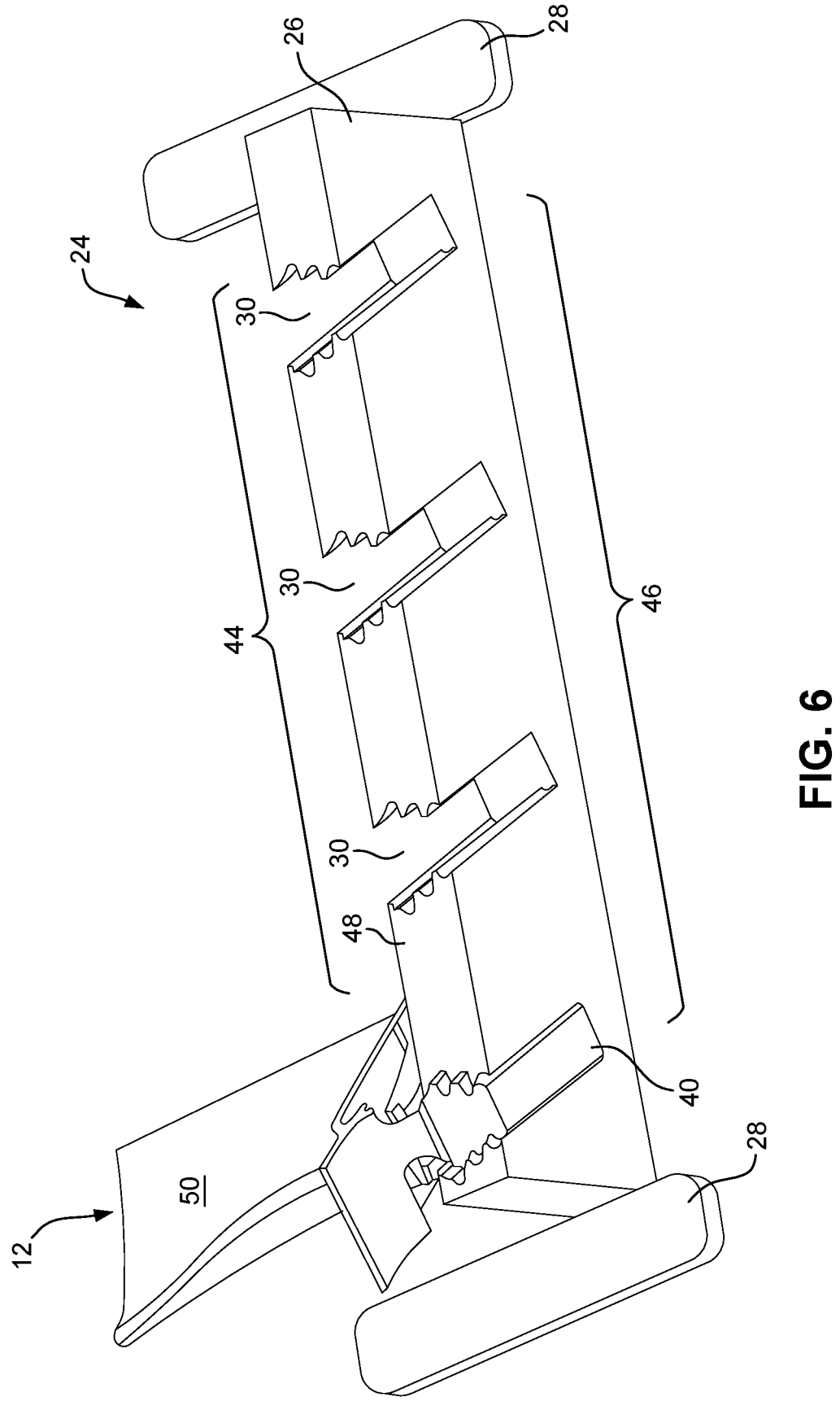
FIG. 6 is a perspective view of another turbine component holder.

FIG. 6 illustrates an alternative arrangement of the holding spaces 30. In particular, the dividing walls 48 are arranged so that all of the holding spaces 30 are wider on the same lateral side and are all narrower on the same lateral side. For example, as shown in FIG. 6, all of the holding spaces 30 are wider on the first lateral side 44 than on the second lateral side 46. It should be understood that there may be arrangements in which the reverse is true. In this arrangement, all of the turbine blades 12 may be oriented so that the airfoil portions 50 are positioned adjacent to the first lateral side 44 or vice versa. Although the capacity of the blade holder 24 for this arrangement may be less than the capacity of the "alternating" arrangement illustrated in FIGS. 2-5, the results of the analysis may be more consistent because all of the turbine blades 12 are oriented in the same direction.

Figure 7:
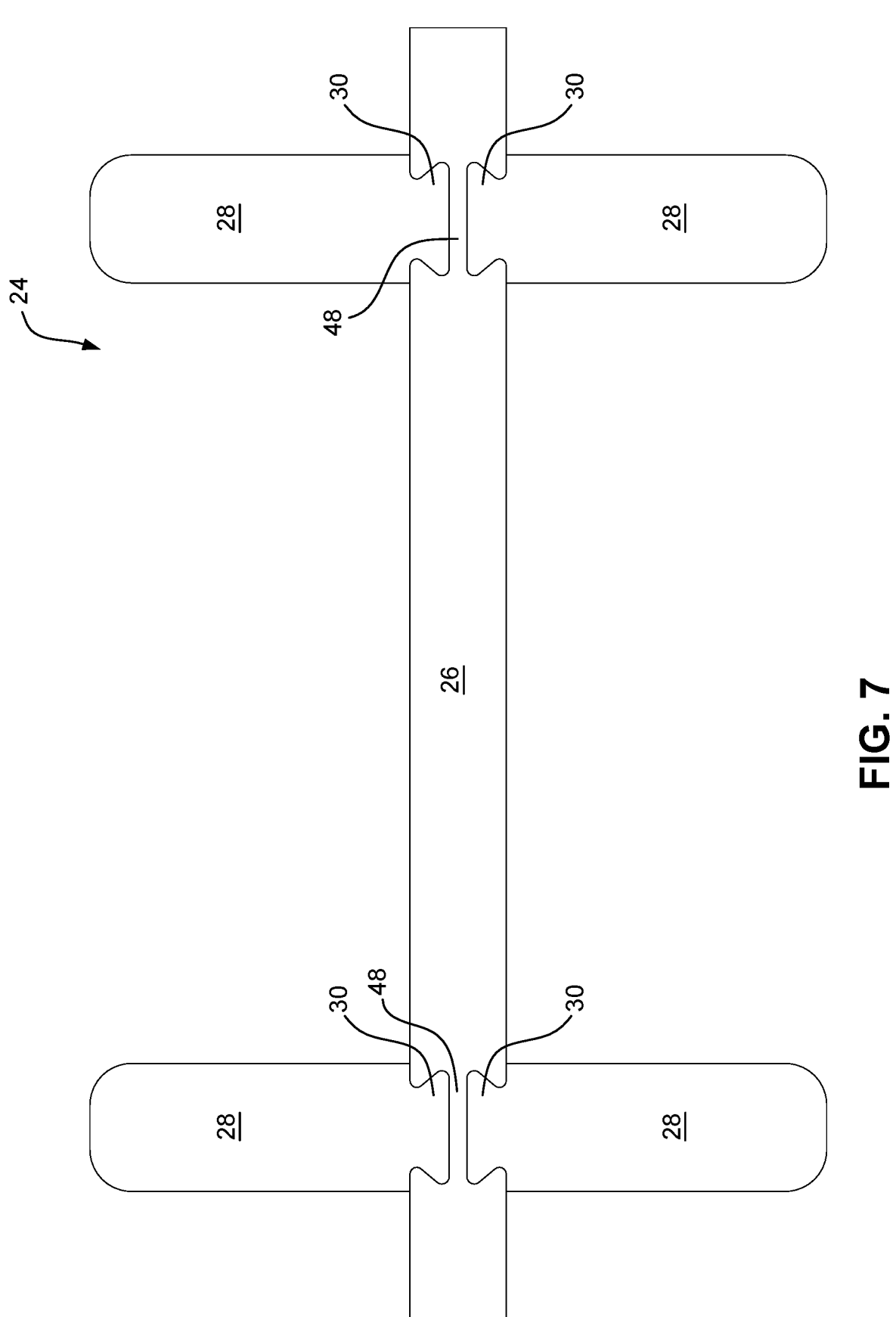
FIG. 7 is a top view of another turbine component holder.

FIG. 7 illustrates another alternative arrangement of holding spaces 30. In particular, rather than being arranged longitudinally, the holding spaces 30 in FIG. 7 may be arranged laterally. As can be seen, the holding spaces 30 may be in the form of back-to-back dovetails with one dovetail being on the first lateral side 44 of the main body 26 and another dovetail being on the second lateral side 46 of the main body 26. The dividing wall 48 may extend in a longitudinal direction rather than a lateral direction as is the case in the arrangements illustrated in FIGS. 2-6. The widest portions of the holding spaces 30 may be adjacent to the dividing wall 48, while the narrowest portions of the holding spaces 30 may be distal to the dividing wall 48.

In all of the arrangements of the turbine blade holder 24, the turbine blade 12 may be inserted into the corresponding holding space 30 from above (e.g., dropped or lowered into the holding space 30). In addition, given the particular shape of the holding space 30, the turbine blade 12 can only be inserted into the holding space 30 in one particular orientation. In addition, inserting the turbine blade 12 into the holding space 30 automatically secures the turbine blade 12 and automatically orients the turbine blade 12 into the desired position. In other words, the holding spaces 30 are designed so that gravity holds and secures the turbine blades 12 in place during analysis. Also, the dimensions of the holding spaces 30 may be such that the turbine blade 12 is held in place by way of an interference fit without any additional component such as clamps or snaps holding the turbine blade 12 in place.

In addition, although the drawings show configurations including four or eight holding spaces 30, it is contemplated that the blade holder 24 may contain any number of holding spaces 30, e.g., anywhere from one holding space 30 to twenty holding spaces 30 or more. In addition, the main body 26 may be modular with each module containing one or more holding spaces 30. The modules may be combined with other modules to obtain a desired number of holding spaces 30. In addition, different modules may be mixed and matched so that different sized turbine blades 12 or different shaped turbine blades 12 may be analyzed together all at once. The modules may be secured to each other by way of dovetails, interference fit, snap fit, fasteners, and magnets.

Figure 8:
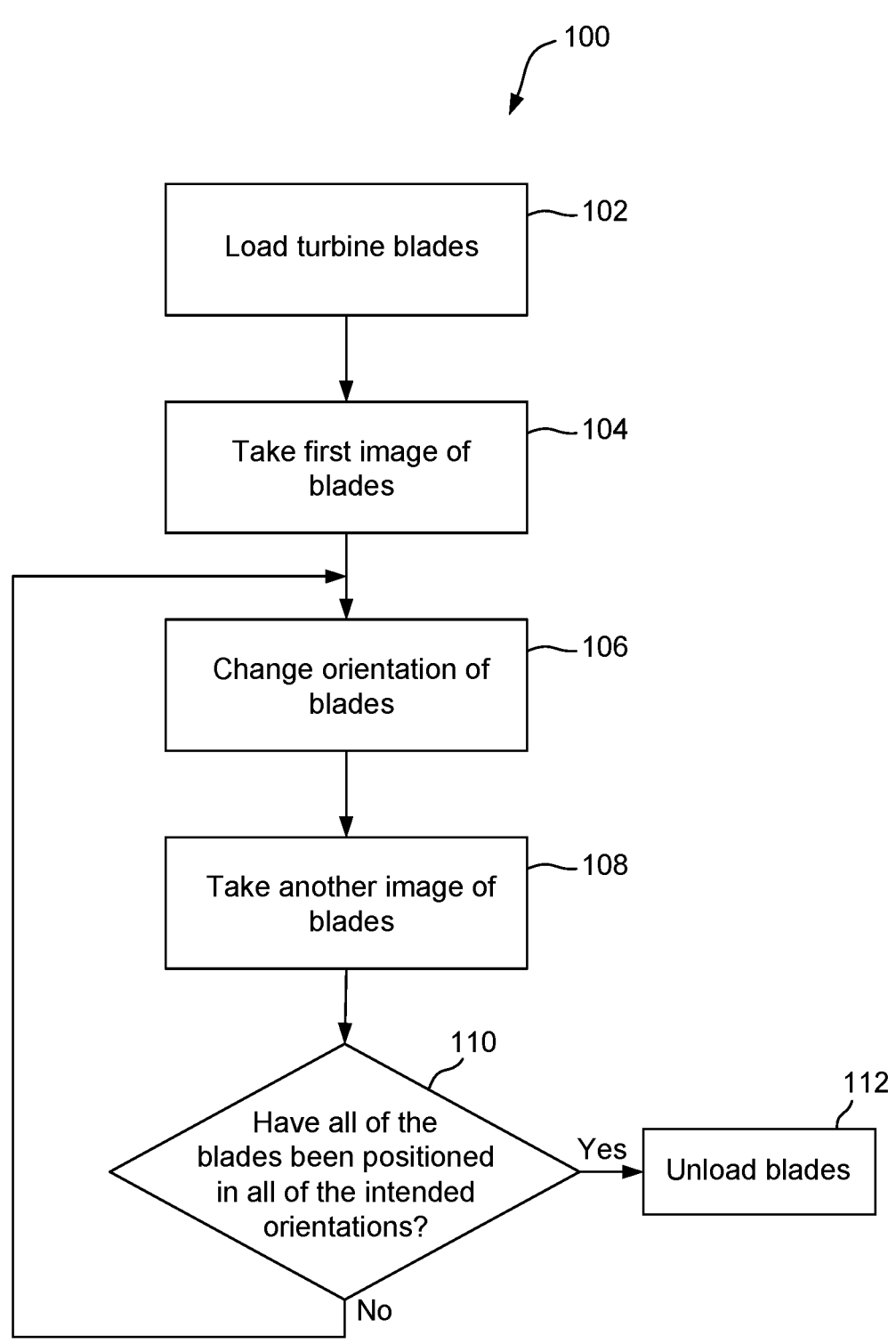
FIG. 8 is a flow chart for a method of taking an image of turbine components in different orientations.

FIG. 8 illustrates a method 100 for taking an image of the turbine blades 12 during inspection. The method 100 may begin by loading the turbine blades 12 onto the blade holder 24 (step 102). The turbine blades 12 may be inserted into the holding spaces 30 from above. In addition, the orientation of the dove-tail shape of each holding space 30 determines the orientation of the turbine blade 12 when the turbine blade 12 is inserted into the holding space 30. For the blade holder 24 illustrated in FIGS. 2-5, a first set of turbine blades may be oriented so that the airfoil portion extends laterally in a first direction, while a second set of turbine blades may be oriented so that the airfoil portion extends laterally in a second direction that is opposite the first direction.

It is also contemplated that all of the turbine blades 12 are positioned in the same orientation (see the configuration illustrated in FIG. 6). In addition, the turbine blades 12 may be positioned so that adjacent turbine blades 12 may have different orientations. Also, the blade holder 24 may have a first section that holds the turbine blades 12 in a first orientation and a second section that holds the turbine blades 12 in a second orientation. It is further contemplated that the turbine holder 24 may be capable of holding the turbines 12 at three or more different orientations. In addition, multiple blade holders 24 may be loaded with turbines. The multiple blade holders 24 may hold the turbine blades 12 at the same orientations. Alternatively, each blade holder 24 may hold the turbine blades 12 at different orientations from other blade holders 24.

Once the turbine blades 12 have been loaded onto the one or more blade holders 24, the blade holders 24 may be positioned between the x-ray source 14 and the digital detector array 16. The x-ray source 14 may be actuated to emit a beam of x-ray radiation through the turbine blades 12 and to the digital detector array 16 to take an image of the turbine blades 12 (step 104).

Once the image has been taken, the orientations of the turbine blades 12 may be changed (step 106). One way to change the orientations of the turbine blades 12 is to rotate the blade holder 24 by about 180 degrees. This way, the turbine blades 12 that were originally in a first orientation will now be in a second orientation. In addition, the blades that were originally in the second orientation will now be in the first orientation.

Another way to change the orientations of the turbine blades 12 is to move the turbine blades 12 to different holding spaces 30, This way, a turbine blade 12 that was originally in a first holding space 30 oriented in the first direction may be moved to second holding space 30 oriented in the second direction. It is contemplated that for configurations using multiple blade holders 24, the turbine blades 12 may be swapped between the different blade holders 24.

Once the orientations of the turbine blades 12 have changed, another image of the turbine blades 12 may be taken (step 108). This may be achieved in the same manner the image was taken in step 104. In addition, once the second image has been taken, it may be determined whether the turbine blades 12 have been imaged in all of the desired orientations (step 110). If there are more orientations to be imaged, step 106 may be repeated. Otherwise, the turbine blades 12 may be unloaded from the blade holder 24 (step 112) and the method 100 may end.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both, unless this application states otherwise. Also, the terms "approximately", "about", and "substantially" encompass a range of plus or minus 15%. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A holder configured to hold a turbine component in position for internal imaging, the holder comprising:
    a main body configured to support one or more turbine components; and
    one or more holding spaces in in the main body, each holding space being configured to retain a corresponding turbine component,
    wherein each of the one or more holding spaces is configured to automatically secure and orient the corresponding turbine component by way of an interference fit upon the turbine component being inserted into the holding space, and
    wherein the one or more holding spaces are configured to enable an imaging system to take an image of multiple turbine components in one or more orientations at the same time.

2. The holder of claim 1, wherein the holder is configured to hold turbine components in multiple orientations.

3. The holder of claim 1, wherein each of the one or more holding spaces are in the form of a notch in the main body, each notch being open at the top and at opposing lateral sides.

4. The holder of claim 3, wherein each notch is oriented at an angle relative to a horizontal plane so that the notch receives a corresponding turbine component along a plane that intersects horizontal at the angle.

5. The holder of claim 3, wherein each of the one or more holding spaces are configured to receive the corresponding turbine component from above.

6. The holder of claim 1, wherein the one or more holding spaces includes two sets of holding spaces with each holding space of the first set being configured to hold a corresponding turbine component at a first orientation and each holding space of the second set being configured to hold a corresponding turbine component at a second orientation.

7. The holder of claim 1, wherein the one or more holding spaces are bound by opposing contoured surfaces.

8. The holder of claim 1, wherein the holder is formed by way of 3D printing.

9. The holder of claim 1, wherein the holder is configured to hold a turbine blade.

10. An x-ray imaging system for imaging a plurality of turbine blades, the system comprising:
    an x-ray source;

a digital detector array;
    the holder of claim 1, the holder being positioned between the x-ray source and the digital detector array; and
    a control system configured to actuate the x-ray source and receive data from the digital detector array.

11. The holder of claim 1, wherein the one or more holding space comprises multiple holding space, wherein adjacent holding spaces share a common wall, and wherein adjacent holding spaces is configured to hold respective turbine components in different orientations.

12. A holder configured to hold a plurality of turbine blades in position for internal imaging, the holder comprising:
    a main body configured to support the plurality of turbine blades;
    a first set of notches in the main body configured to hold turbine blades in a first orientation; and
    a second set of notches in the main body configured to hold turbine blades in a second orientation,
    wherein each of the notches of the first and second sets of notches is configured to automatically secure and orient a corresponding turbine blade upon the turbine blade being inserted into the respective notch, and
    wherein the first and second sets of notches are configured to enable an imaging system to take an image of multiple turbine blades in one or more orientations at the same time.

13. The holder of claim 12, wherein each of the notches of the first and second sets of notches is open at the top and at opposing lateral sides.

14. The holder of claim 13, wherein each of the notches is configured to receive the corresponding turbine blade from above.

15. The holder of claim 12, wherein each notch of the first and second sets of notches is oriented at an angle relative to a horizontal plane so that the notch receives a corresponding turbine blade along a plane that intersects horizontal at the angle.

16. The holder of claim 12, wherein the notches of the first and second sets of notches are bound by opposing contoured surfaces.

17. The holder of claim 16, wherein the notches of the first and second sets of notches are configured to hold a root portion of a corresponding turbine blade.

18. The holder of claim 12, wherein the holder is formed by way of 3D printing.

19. An x-ray imaging system for imaging a plurality of turbine blades, the system comprising:
    an x-ray source;
    a digital detector array;
    the holder of claim 12, the holder being positioned between the x-ray source and the digital detector array; and
    a control system configured to actuate the x-ray source and receive data from the digital detector array.

20. The holder of claim 12, wherein the first and second sets of notches are located in the main body in an alternating arrangement in which each notch from the first set of notches is adjacent to a corresponding notch from the second set of notches, and wherein said adjacent notches share a common wall.

21. A method for positioning a turbine blade for x-ray imaging, the method comprising:
    sliding a turbine blade into a receiving space in a blade holder; and
    positioning the turbine blade and the blade holder between an x-ray source and a digital detector array,

11 wherein sliding the turbine blade into the receiving space in the blade holder automatically orients the turbine blade at a target orientation for imaging the internal structure of the turbine blade, wherein sliding the turbine blade into the receiving space 5 in the blade holder automatically secures the turbine blade in the receiving space, and wherein the receiving space enables an imaging system to take an image of the turbine blade in one or more orientations at the same time. 10

22. The method of claim 21, wherein the receiving space is one of a first set of receiving spaces in the blade holder and the blade holder comprises a second set of receiving spaces, wherein the receiving spaces of the first set can only receive respective turbine blades in a first orientation, 15 and wherein the receiving spaces of the second set can only receive respective turbine blades in a second orientation different from the first orientation.

23. The method of claim 21, wherein the turbine blade is 20 one of multiple types of turbine components, wherein the method further comprises loading multiple types of turbine components onto the blade holder and imaging the multiple turbine components simultaneously, and wherein the blade holder holds the different turbine components in different 25 orientations.

24. The method of claim 21, wherein the turbine blade is held in place within the receiving space by gravity.

25. The method of claim 21, wherein the turbine blade is held in place by an interference fit. 30

* * * * *